United States Patent [19]

O'Connor et al.

[11] 4,249,810
[45] Feb. 10, 1981

[54] PIPELINE INSPECTION APPARATUS

[75] Inventors: Donald T. O'Connor, Barrington; Donald E. Lorenzi, Des Plaines; John J. Flaherty, Elk Grove Village; Edward Schaefer, Bellwood, all of Ill.

[73] Assignee: Magnaflux Corporation, Chicago, Ill.

[21] Appl. No.: 881,148

[22] Filed: Feb. 27, 1978

[51] Int. Cl.³ .............................................. G03B 37/00
[52] U.S. Cl. ..................................... 354/63; 346/33 P
[58] Field of Search ...... 354/63; 346/33 WL, 107 W, 346/33 P

[56] References Cited

U.S. PATENT DOCUMENTS

| | | | |
|---|---|---|---|
| 2,892,150 | 6/1959 | Nettles et al. | 346/33 P |
| 2,971,259 | 2/1961 | Hahnau et al. | |
| 3,064,127 | 11/1962 | Green et al. | 346/33 P |
| 3,244,085 | 4/1966 | Pulfer | 354/63 |
| 3,667,359 | 6/1972 | Watts et al. | 354/63 |
| 3,732,434 | 5/1973 | French | |
| 3,974,680 | 8/1976 | Beaver | |
| 4,008,603 | 2/1977 | Paulissen | |
| 4,072,894 | 2/1978 | Barton | |
| 4,092,868 | 6/1978 | Thompson | 73/638 |
| 4,105,972 | 8/1978 | Smith | |

FOREIGN PATENT DOCUMENTS 4517840 6/1970 Japan ......................................... 354/63

OTHER PUBLICATIONS

Inter-Market Publication "Miniature CCTV Systems", Series 50/80 Systems.

Primary Examiner—Monroe H. Hayes
Attorney, Agent, or Firm—Neuman, Williams, Anderson & Olson

[57] ABSTRACT

Pipeline inspection apparatus is provided including a camera unit and associated illumination means, preferably a strobe flash unit, for recording on photographic film the images of internal surface portions of a pipe for detection of defects. The camera unit is moved longitudinally within a pipeline by a drive unit which preferably includes electric motors energized from a self-contained battery unit. Important features relate to means for automatically reversing the drive of the apparatus after it has travelled a predetermined distance and to mechanical features for facilitating movement of the device through bends and the like.

3 Claims, 9 Drawing Figures

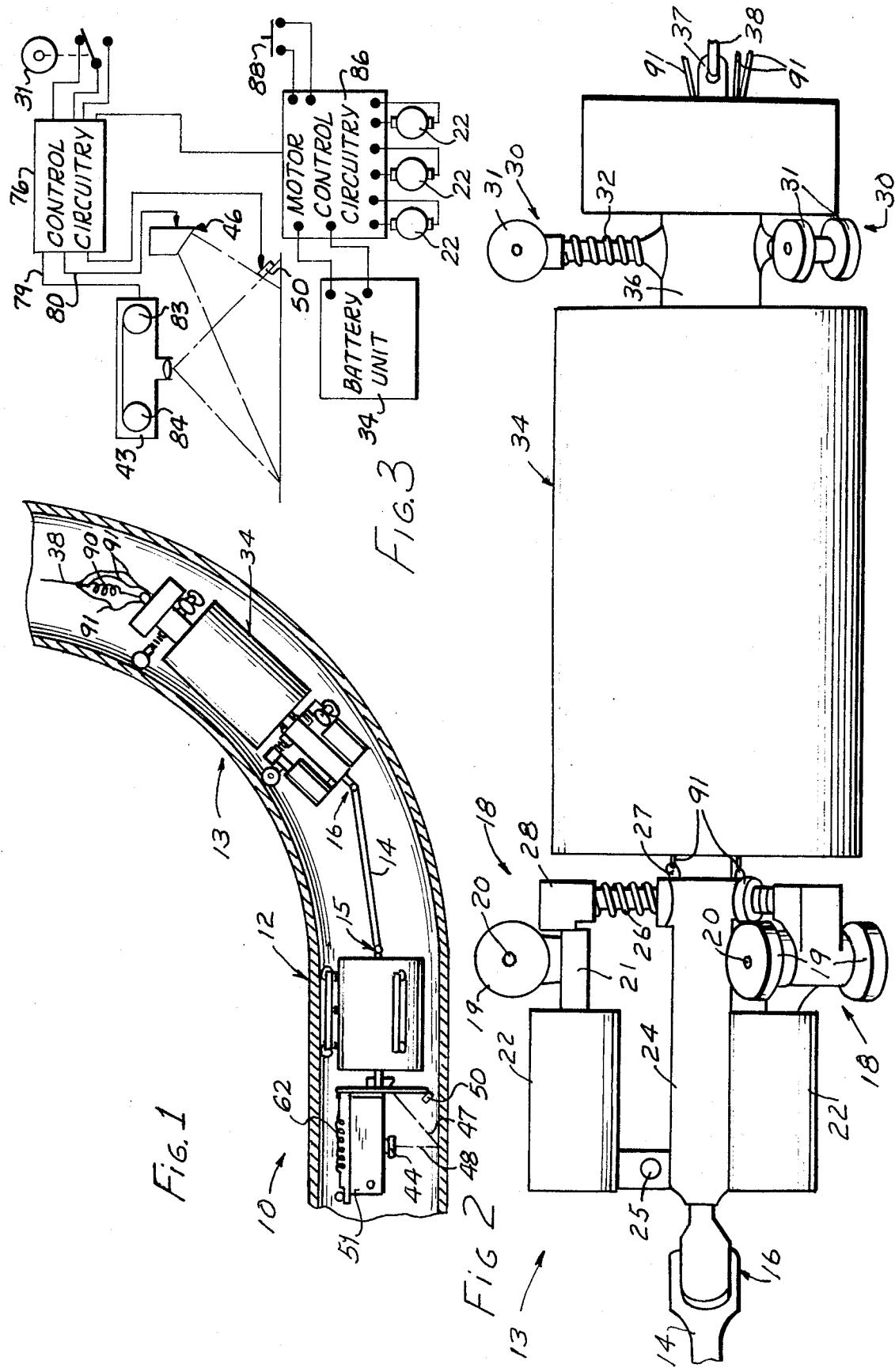

PIPELINE INSPECTION APPARATUS

This invention relates to pipeline inspection apparatus and more particularly to apparatus movable within a pipe for detecting potentially damaging and dangerous flaws in the pipe with a high degree of effectiveness and reliability. The apparatus produces a photographic record which can be accurately interpreted and which facilitates repair of the pipe and, at the same time the apparatus is relatively simple and easy to operate.

BACKGROUND OF THE PRIOR ART

Various techniques have heretofore been proposed for pipe inspection, including magnetic inspection by leakage field and/or eddy current techniques, gamma or X-ray techniques, ultrasonic techniques and television techniques. Each of such techniques may be used to advantage in certain applications but each has serious limitations as to others, such as, for example, the inspection of pipeline used for transport of natural gas from offshore stations. Natural gas cannot be treated offshore and in a raw state may include the combination of carbon dioxide and free water which produces carbonic acid and causes corrosion of steel, especially when the temperature is relatively high as is often the case. The corrosion is augmented by an erosion effect where the rate of flow is high and at bends and over weld beads or the like where the flow is turbulent. If localized damage to the pipe could be detected before it presents a serious problem, it would be possible to effect repair or to otherwise take corrective measures. For example, it is possible to move devices known as "pigs" through a pipe and by moving a series of such pigs through a pipe, it can be cleaned, etched, washed, dehydrated and then coated with a protective coating such as an epoxy. Such a procedure is, of course, relatively expensive especially in that the pipeline cannot be used for an extended period of time, and it is not desirable to utilize the procedure unless and until the necessity therefor can be established by a suitable inspection. Also, even after a protective coating is applied, there is the possibility of breaks in the coating and further periodic inspection is desirable to make certain that the coating is properly protecting the pipe. Accordingly, a reliable and accurate way of inspecting such pipeline for defects would be highly desirable.

As above indicated, prior art techniques are not satisfactory. Magnetic inspection if properly performed has many advantages including a high degree of sensitivity to flaws of types which may cause problems and the ability to cover large distances with suitable magnetic recording or other information storage equipment. However, there are disadvantages including the necessity of having operators with a high degree of skill in order to obtain an accurate interpretation of the information obtained. Ultrasonic techniques have a serious disadvantage in that it is difficult to couple the ultrasonic energy into the wall of a pipe and television techniques have a serious disadvantage, at least in the present state of development, in that a high sensitivity and high resolution is difficult to obtain especially if a substantial length of pipe is to be inspected and the information is to be recorded. If the information is to be transmitted through a cable, there is a problem as to loss of sensitivity at great distances and the difficulty in moving a cable having a large mass through a pipeline.

SUMMARY OF THE INVENTION

This invention was evolved with the general object of overcoming the disadvantages of prior art pipeline inspection systems and of providing apparatus which can move within a pipeline and which will detect potentially dangerous flaws with a high degree of reliability and effectiveness and which produces records which can be easily and accurately interpreted.

In apparatus constructed in accordance with this invention, a photographic camera is carried by a device which is arranged to be inserted into a pipe and which is movable longitudinally therewithin. An illumination source, preferably including a strobe flash unit, is provided for illuminating an internal surface area an image of which is projected optically to an image area of the camera and film storage and transport means of the camera are operated during movement of the device within the pipe to record a series of images on photographic film moved through the image area. With this arrangement, it is possible to produce pictures which can be readily interpreted and which provide an accurate indication of defects of the type which might lead to serious problems. It is also possible to produce pictures with more than adequate resolution while using a high ratio between the size of the internal surface area of the pipe and the size of the corresponding image area recorded on the film, the result being that sufficient film can be carried by the device to permit inspection of a long length of pipe.

Important features relate to constructions such that the device will properly record pictures on film while also being movable through pipe bends and through vertical pipe sections. In one embodiment, drive means are provided including drive wheels driven by motive power means, preferably electric motors energized from batteries. The apparatus may be thus self-contained but as a safety feature, it may be connected to a tether for withdrawal in case of a malfunction of the device. A specific feature relates to an arrangement for release of pressure between drive wheels and the pipe in response to application of a certain pulling force by the tether.

Another specific feature relates to means for automatically reversing the drive of the device after travel through a predetermined distance preferably including a pulse counting arrangement with each pulse being developed in response to travel through a predetermined distance.

This invention contemplates other objects, features and advantages which will become more fully apparent from the following detailed description taken in conjunction with the accompanying drawings.

BRIEF DESCRIPTION OF THE DRAWINGS

FIG. 1 is a view illustrating apparatus constructed in accordance with the invention moving through a bend portion of a pipeline;

FIG. 2 is a side elevational view of a drive unit of the apparatus; and

FIG. 3 is a schematic electrical diagram of the apparatus of FIGS. 1-2.

DESCRIPTION OF A PREFERRED EMBODIMENT

Reference numeral 10 generally designates a pipe inspection apparatus constructed in accordance with the principles of this invention. The apparatus 10 is arranged to be disposed inside a pipe such as in an offshore gas pipeline, for example, and is arranged to move along the pipe to inspect the walls of the pipe for defects which might ultimately lead to rupture of the pipe if not corrected. The apparatus 10 is shown in a bend of a pipe 11 which may, for example, be a bend at the lower end of a vertical pipe section which extends down from an off-shore station.

The illustrated apparatus 10 includes a camera unit 12 and a drive unit 13 with a coupling therebetween including a bar 14 having opposite ends coupled to the units 12 and 13 through U-joints 15 and 16.

The illustrated drive unit 13 includes three motor-driven wheel assemblies 18 each including a pair of wheels 19 on a shaft 20 driven through a gear reduction unit 21 from an electric motor 22. The housing of each motor 22 is hingedly connected to a frame member 24 through a pin 25 and at the opposite end, a compression spring 26 acts between a pin 27 carried by the frame member 24 and a socket member 28 which is secured to the housing of the gear reduction unit 21, the wheels 19 being urged radially outwardly into pressure engagement with the inside surface of the pipe 11. Pin 27 may be withdrawn for release of pressure as hereinafter described. The three wheel assemblies 18 are preferably in equi-angularly spaced relation, 120 degrees from each other.

At the opposite end of the drive unit, three idler wheel assemblies 30 are provided each including a pair of wheels 31 urged radially outwardly by a spring 32, the assemblies 30 being preferably spaced equi-angularly, 120 degrees from each other. A battery unit 34 is carried by the frame of the drive unit 13 between the motor-driven wheel assemblies 18 and the idler wheel assemblies 30 and an electrical control unit 35 is carried on a projecting frame member 36. A hook 37 is provided on the terminal end of the frame member 36 for connection to a tether cable 38.

The camera unit 12 includes a camera 40 which includes electrically operated film storage and transport means whereby photographic film is moved from a supply reel within one end portion 41 of a housing 42 to a take-up reel within an opposite end portion 43 of the housing 42. The camera 40 further includes a lens assembly 44 which operates to project an image of the inside surface of the pipe onto a section of the film positioned at an image area intermediate the supply and take-up reels.

To illuminate the inside surface of the pipe, an electrically operated strobe flash unit 46 is provided arranged to project a beam of light along an axis 47 which intersects the central axis of the lens 44, indicated by reference numeral 48, at a point on the inside surface of the pipe.

The orientation of the illumination and lens axes 47 and 48 are of substantial importance. Preferably, the lens axis is generally normal to the inside surface of the pipe, i.e. at substantially a right angle to the pipe axis and the illumination axis is at an acute angle, preferably on the order of 45 degrees or less. Corrosion pits or the like cast shadows such that from inspection of a developed picture, an accurate estimate can be made with respect to the depth of a pit or the like and as to whether it necessitates a repair operation on the pipe.

A counter 50 is energized from pulses generated in response to movement of the apparatus within the pipe and registers the distance travelled, being disposed within the field of view of the lens 44 so as to record the position in each film frame.

The camera 40 is secured to a frame 51 which may carry suitable caster wheel assemblies at one end thereof. At the opposite end thereof, the camera support frame 51 is hingedly supported through an arrangement which permits the device to negotiate turns or bends in the pipe, the camera frame 51 being preferably pivotal about three mutually transverse axes while being urged by a spring 62 to the position as illustrated in FIG. 1.

FIG. 3 is a schematic diagram of electrical circuitry for the apparatus 10. Control circuitry 76 is connected through lines 78, 79 and 80 to the camera 40, strobe unit 46 and counter 50 and is also connected to a switch device 82 which is operated from one of the wheels engaged with the inside surface of the pipe, such as one of the idler wheels 31 and which generates a pulse in response to rotation of the wheel through a certain angle and thereby in response to movement of the apparatus a certain distance. Electronic counter means are provided in the control circuit 76 to apply a triggering signal to the strobe unit 46 after a certain number of such pulses. After a certain delay, indexing pulses are applied to the counter 50 and also to film drive means of the camera 40. As diagrammatically shown in FIG. 5, the camera 40 includes a film supply reel 83 in the housing end portion 41 and a film take-up reel 84 in the housing end portion 43 with suitable electrically operated drive means being provided for driving the take-up reel 84 and film 85. Thus a series of pictures are taken along the length of the pipe.

A motor control circuit 86 is provided which is connected to the battery unit 34 and to the drive motors 22 and also to the control circuitry 76 and a start switch 88. With the apparatus disposed in one end of a pipeline or in a launching pipe section which feeds into a pipeline, the start switch 88 is depressed to cause energization of the drive motors 22 and to initiate movement of the apparatus along the pipeline. The apparatus may continue movement until it reaches the other end of a pipeline. Alternatively, counter means within the motor control circuit 86 may respond to signals from the control circuitry 76 to operate after a certain number of pulses are applied and thereby after the apparatus travels a certain distance, to reverse the polarity of the voltages applied to the motors 20 and to cause the apparatus to move in the reverse direction and return to its initial position. This automatic reversing feature is highly advantageous in that the portion of a pipeline extending only a relatively short distance such as from 1000 to 2000 feet away from an offshore station may be inspected. Many of the problems which can be detected by the apparatus are found within such a relatively short distance from offshore stations and the use of the apparatus in this way is thus highly productive. Also, it does not require that the apparatus be capable of travelling very large distances.

A very high degree of reliability can be obtained with drive means such as illustrated but it is nevertheless desirable to provide a back-up in the event of failure of the drive means, and it is for this reason that the hook 37 is provided for connection to the tether cable 38, so that the apparatus can be withdrawn by means of the cable 38. It is noted that the motor-driven wheel assemblies 18 desirably include the gear reduction units 21 which allow the motors to be operated at relatively high speeds so as to be of relatively small size. With such gear reduction units, however, it is found that in case of deenergization of the motors, the high degree of friction is encountered when attempting to move the apparatus by means of the tether cable 38. In accordance with a specific feature, a spring 90 is provided in the connection between the cable 38 and the hook 37 and three lines 91 are provided between the cable 38 and the pins 27 of the drive wheel assemblies. When the tension in the cable 38 reaches a predetermined level, the spring 90 is stretched to an extent such that the cable 38 acts through the lines 91 to retract the pins 27 and to allow the inner ends of the springs to move inwardly and thus release the pressure applied by the wheels 19. Accordingly, the apparatus can be readily withdrawn, friction being minimized.

It will be understood that modifications and variations may be effected without departing from the spirit and scope of the novel concepts of this invention.

We claim as our invention:

1. In pipe inspection apparatus, a device arranged to be inserted into a pipe for longitudinal movement therewithin, photographic camera means carried by said device including film storage and transport means arranged for feeding film through an image area and optical means for projecting to said image area an image from an internal surface area of the pipe, illumination means for illuminating said internal surface area of the pipe, and operating means for operating said film storage and transport means and said illumination means during movement of said device along the pipe for recording on the film a sequence of images of the internal surface of the pipe, drive means including drive wheel means for engagement with the inside surface of the pipe and motive power means for rotating said drive wheel means to move said device along the pipe, connection means for connecting a tether to said device for withdrawal of said device from the pipe independently of said drive means, said drive means being operable between a drive condition wherein said drive wheel means are in pressure engagement with said inside surface and are coupled to said motive power means to develop a relatively high frictional force opposing movement of the device by the tether and a release condition in which said frictional force is reduced to a relatively low value, and means interconnecting said connection means and said drive means for operating said drive means to said release condition in response to application of a predetermined force by the tether.

2. In apparatus as defined in claim 1, said drive means including spring means for urging said drive wheel means into pressure traction engagement with the inside surface of the pipe, said spring means being operable to a release condition to substantially eliminate said pressure traction engagement.

3. In pipe inspection apparatus, a device arranged to be inserted into a pipe for longitudinal movement therewithin, photographic camera means carried by said device including film storage and transport means arranged for feeding film through an image area and optical means for projecting to said image area an image from an internal surface area of the pipe, illumination means for illuminating said internal surface area of the pipe, operating means for operating said film storage and transport means and said illumination means during movement of said device along the pipe for recording on the film a sequence of images of the internal surface of the pipe, drive means including drive wheel means for engagement with the inside surface of the pipe and motive power means for rotating said drive wheel means to move said device along the pipe, reversing means operable upon movement of said device through substantially a predetermined distance along the pipe for reversing said drive means to effect movement of the device in a reverse direction, said reversing means comprising means for developing an electrical pulse in response to movement of said device through a certain distance, counter means for counting a predetermined number of said pulses to develop a reversing signal, and means responsive to said reversing signal to reverse said drive means.

* * * * *